US010721051B2

(12) United States Patent
Laselva et al.

(10) Patent No.: US 10,721,051 B2
(45) Date of Patent: Jul. 21, 2020

(54) ENCRYPTION MANAGEMENT IN CARRIER AGGREGATION

(71) Applicant: Nokia Technologies Oy, Espoo (FI)

(72) Inventors: Daniela Laselva, Klarup (DK); Frank Frederiksen, Klarup (DK)

(73) Assignee: Nokia Technologies Oy, Espoo (FI)

( * ) Notice: Subject to any disclaimer, the term of this patent is extended or adjusted under 35 U.S.C. 154(b) by 191 days.

(21) Appl. No.: 15/599,486

(22) Filed: May 19, 2017

(65) Prior Publication Data
US 2017/0338937 A1 Nov. 23, 2017

Related U.S. Application Data

(60) Provisional application No. 62/339,175, filed on May 20, 2016.

(51) Int. Cl.
H04W 12/06 (2009.01)
H04L 5/00 (2006.01)
H04W 76/16 (2018.01)
H04W 36/00 (2009.01)
H04W 12/04 (2009.01)
H04L 29/06 (2006.01)
H04W 36/30 (2009.01)
H04W 12/02 (2009.01)
(Continued)

(52) U.S. Cl.
CPC ............ H04L 5/0098 (2013.01); H04L 63/08 (2013.01); H04L 63/164 (2013.01); H04W 12/02 (2013.01); H04W 12/04 (2013.01); H04W 12/06 (2013.01); H04W 36/0066 (2013.01); H04W 36/30 (2013.01); H04W 72/042 (2013.01); H04W 76/16 (2018.02); H04L 5/001 (2013.01); H04L 2209/80 (2013.01); H04W 84/12 (2013.01); H04W 88/06 (2013.01)

(58) Field of Classification Search
None
See application file for complete search history.

(56) References Cited

U.S. PATENT DOCUMENTS 9,491,674 B2 * 11/2016 Singh ..................... H04W 36/08
9,526,119 B2 * 12/2016 Sedlacek ............... H04W 12/06
(Continued)

OTHER PUBLICATIONS

China Telecom: Support of high data rate 802.11 technologies. 3GPP Draft, R2-163854 Support for High Data Rates 802.11, vol. RAN WG2, No. Nanjing, May 13, 2016.
(Continued)

Primary Examiner — Edan Orgad
Assistant Examiner — Emmanuel K Maglo
(74) Attorney, Agent, or Firm — Laine IP Oy

(57) ABSTRACT

According to an example aspect of the present invention, there is provided an apparatus comprising a memory configured to store information and at least one processing core configured to cause the information to be transmitted toward a user equipment in a downlink direction, partly via a cellular carrier and partly via a non-cellular carrier, the cellular and non-cellular carriers being together in a carrier aggregation, determine a handover of the cellular carrier is likely, wherein the handover does not change an access point providing the non-cellular carrier, and responsive to the determination, disable a ciphering of the part of the information conveyed toward the user equipment via the non-cellular carrier.

36 Claims, 7 Drawing Sheets

(51) Int. Cl.
*H04W 72/04* (2009.01)
*H04W 84/12* (2009.01)
*H04W 88/06* (2009.01)

(56) References Cited

U.S. PATENT DOCUMENTS

| | | | | |
|---|---|---|---|---|
| 2002/0147008 | A1* | 10/2002 | Kallio | H04W 36/14 |
| | | | | 455/426.1 |
| 2013/0005332 | A1* | 1/2013 | Sedlacek | H04L 63/0892 |
| | | | | 455/426.1 |
| 2013/0316762 | A1* | 11/2013 | Charbit | H04W 4/70 |
| | | | | 455/552.1 |
| 2014/0329526 | A1* | 11/2014 | Sundararajan | H04W 36/24 |
| | | | | 455/436 |
| 2015/0109997 | A1* | 4/2015 | Sirotkin | H04L 47/28 |
| | | | | 370/328 |
| 2016/0219024 | A1* | 7/2016 | Verzun | H04L 63/102 |
| 2016/0337177 | A1* | 11/2016 | Lindoff | H04W 16/14 |
| 2017/0070923 | A1* | 3/2017 | Li | H04W 36/0066 |
| 2017/0127330 | A1* | 5/2017 | Payyappilly | H04W 24/10 |
| 2017/0289883 | A1* | 10/2017 | Kiss | H04W 4/90 |
| 2017/0346854 | A1* | 11/2017 | Kumar | H04L 63/0428 |
| 2017/0367007 | A1* | 12/2017 | Sirotkin | H04L 63/0428 |
| 2018/0092147 | A1* | 3/2018 | Pelletier | H04L 63/205 |

OTHER PUBLICATIONS

Intel Corporation: User plane aspects of LWA support for high data rate 802.11 technologies. 3GPP Draft, R2-162462-ELWA-USER-PLANE-ASPECTS-V2, vol. RAN WG2, No. Dubrovnuk, Apr. 2, 2016.

Samsung: Solutions for LTE handover while maintaining LTE-WLAN aggregation. 3GPP Draft; R2-163363, vol. RAN WG2, No. Nanjing, May 12, 2016.

* cited by examiner

ENCRYPTION MANAGEMENT IN CARRIER AGGREGATION

FIELD

The present disclosure relates to managing encryption in carrier aggregation scenarios, for example in cellular-non-cellular carrier aggregation.

BACKGROUND

Wireless communication may be conducted using, in general, cellular and/or non-cellular technologies. Cellular technologies include, for example, wideband code division multiple access, WCDMA, long term evolution, LTE, and 5G. Non-cellular technologies include, for example, wireless local area network, WLAN, and worldwide interoperability for microwave access, WiMAX.

In wireless communication, a wireless connection between a user equipment and a base station, or access point, may be arranged to convey information in the uplink and downlink. The uplink direction proceeds from the user equipment toward the network, and the downlink direction proceeds from the network toward the user equipment. A base station is a term used in connection with cellular technologies, while access point is a term employed frequently when discussing non-cellular technologies.

Some user equipments, such as smartphones, have the ability to select a technology to use from a plurality of available choices. For example, to download a large file, a smartphone may choose to select a non-cellular technology, and to place a voice call the same smartphone may choose to select a cellular technology. Non-cellular technologies may offer high data rates, while cellular technologies may be designed to support mobility and guaranteed quality of service.

Information communicated over cellular or non-cellular connections may be ciphered. Ciphering may alternatively be referred to as encryption. Ciphering may take place at one or more layers, for example, an application may employ end-to-end ciphering, an intermediate protocol layer may employ a ciphering and an air interface may employ a further, separate ciphering, resulting in data communicated over the air interface that may be ciphered more than once, using different algorithms and keys.

Carrier aggregation may be used to facilitate communication, wherein more than one carrier is employed simultaneously to communicate information. The carriers may be of a same or differing types, and similar or differing frequency bands may be used to communicate over the carriers joined together in a carrier aggregation. The expression "dual connectivity" maybe used interchangeably with "carrier aggregation".

SUMMARY OF THE INVENTION

The invention is defined by the features of the independent claims. Some specific embodiments are defined in the dependent claims.

According to a first aspect of the present invention, there is provided an apparatus comprising a memory configured to store information and at least one processing core configured to cause the information to be transmitted toward a user equipment in a downlink direction, partly via a cellular carrier and partly via a non-cellular carrier, the cellular and non-cellular carriers being together in a carrier aggregation, determine a handover of the cellular carrier is likely, wherein the handover does not change an access point providing the non-cellular carrier, and responsive to the determination, disable a ciphering of the part of the information conveyed toward the user equipment via the non-cellular carrier.

Various embodiments of the first aspect may comprise at least one feature from the following bulleted list:

- the at least one processing core is configured to determine the handover is likely based at least partly on measurement reports received from the user equipment
- the at least one processing core is configured to disable the ciphering on a packet by packet basis
- the one processing core is configured to include in the part of the information conveyed via the non-cellular carrier an indication the ciphering has been disabled
- the ciphering comprises ciphering applied to the part of the information conveyed via the non-cellular carrier before it is provided from the apparatus to the access point
- the ciphering comprises at least one of: packet data convergence protocol ciphering and IPsec ciphering
- the at least one processing core is configured to disable and enable the ciphering in dependence of a random process when no handover is determined to be likely
- the apparatus comprises a long term evolution base station, or a long term evolution base station control device
- the at least one processing core is configured to continue ciphering the part of the information transmitted via the cellular carrier when ciphering the part of the information transmitted via the non-cellular carrier is disabled.
- the apparatus is configured to determine, whether a packet received in the apparatus comprises an indication the packet is not ciphered, and responsive to the packet comprising the indication the apparatus is configured to refrain from deciphering the packet, and responsive to the packet not comprising the indication the apparatus is configured to provide contents of the packet to a deciphering function According to a second aspect of the present invention, there is provided an apparatus comprising at least one processing core, at least one memory including computer program code, the at least one memory and the computer program code being configured to, with the at least one processing core, cause the apparatus at least to cause information to be transmitted toward a base station in an uplink direction, partly via a cellular carrier and partly via a non-cellular carrier, the cellular and non-cellular carriers being together in a carrier aggregation, process an instruction received from the base station, and responsive to the instruction, disable a ciphering of the part of the information conveyed toward the base station via the non-cellular carrier.

Various embodiments of the second aspect may comprise at least one feature from the following bulleted list:

- the at least one memory and the computer program code are configured to, with the at least one processing core, cause the apparatus to request from the base station that ciphering should be disabled
- at least one memory and the computer program code are configured to, with the at least one processing core, cause the apparatus to disable the ciphering on a packet by packet basis
- the at least one memory and the computer program code are configured to, with the at least one processing core, cause the apparatus to include in the part of the information conveyed via the non-cellular carrier an indication the ciphering has been disabled the ciphering comprises packet data convergence protocol ciphering the at least one memory and the computer program code are configured to, with the at least one processing core, cause the apparatus to disable and enable the ciphering in dependence of a random process when no handover is determined to be likely the apparatus comprises a user equipment, or a user equipment control device, configured to operate in accordance with the long term evolution communication standard.

the apparatus is configured to determine, whether a packet received in the apparatus comprises an indication the packet is not ciphered, and responsive to the packet comprising the indication the apparatus is configured to refrain from deciphering the packet, and responsive to the packet not comprising the indication the apparatus is configured to provide contents of the packet to a deciphering function According to a third aspect of the present invention, there is provided a method comprising storing information in an apparatus, causing the information to be transmitted toward a user equipment in a downlink direction, partly via a cellular carrier and partly via a non-cellular carrier, the cellular and non-cellular carriers being together in a carrier aggregation, determining a handover of the cellular carrier is likely, wherein the handover does not change an access point providing the non-cellular carrier, and responsive to the determination, disabling a ciphering of the part of the information conveyed toward the user equipment via the non-cellular carrier.

Various embodiments of the third aspect may comprise at least one feature corresponding to a feature in the preceding bulleted list laid out in connection with the first aspect.

According to a fourth aspect of the present invention, there is provided a method comprising causing information to be transmitted from an apparatus toward a base station in an uplink direction, partly via a cellular carrier and partly via a non-cellular carrier, the cellular and non-cellular carriers being together in a carrier aggregation, processing an instruction received from the base station, and responsive to the determination, disabling a ciphering of the part of the information conveyed toward the base station via the non-cellular carrier.

Various embodiments of the fourth aspect may comprise at least one feature corresponding to a feature in the preceding bulleted list laid out in connection with the second aspect.

According to a fifth aspect of the present invention, there is provided an apparatus comprising means for storing information in the apparatus, means for causing the information to be transmitted toward a user equipment in a downlink direction, partly via a cellular carrier and partly via a non-cellular carrier, the cellular and non-cellular carriers being together in a carrier aggregation, means for determining a handover of the cellular carrier is likely, wherein the handover does not change an access point providing the non-cellular carrier, and means for disabling, responsive to the determination, a ciphering of the part of the information conveyed toward the user equipment via the non-cellular carrier.

According to a sixth aspect of the present invention, there is provided an apparatus comprising means for causing information to be transmitted toward a base station in an uplink direction, partly via a cellular carrier and partly via a non-cellular carrier, the cellular and non-cellular carriers being together in a carrier aggregation, means for processing an instruction received from the base station, and means for disabling, responsive to the instruction, a ciphering of the part of the information conveyed toward the base station via the non-cellular carrier.

According to a seventh aspect of the present invention, there is provided a non-transitory computer readable medium having stored thereon a set of computer readable instructions that, when executed by at least one processor, cause an apparatus to at least store information in the apparatus, cause the information to be transmitted toward a user equipment in a downlink direction, partly via a cellular carrier and partly via a non-cellular carrier, the cellular and non-cellular carriers being together in a carrier aggregation, determine a handover of the cellular carrier is likely, wherein the handover does not change an access point providing the non-cellular carrier, and disable, responsive to the determination, a ciphering of the part of the information conveyed toward the user equipment via the non-cellular carrier.

According to an eighth aspect of the present invention, there is provided a non-transitory computer readable medium having stored thereon a set of computer readable instructions that, when executed by at least one processor, cause an apparatus to at least cause information to be transmitted toward a base station in an uplink direction, partly via a cellular carrier and partly via a non-cellular carrier, the cellular and non-cellular carriers being together in a carrier aggregation, process an instruction received from the base station, and disable, responsive to the instruction, a ciphering of the part of the information conveyed toward the base station via the non-cellular carrier.

According to a ninth aspect of the present invention, there is provided an apparatus comprising a memory configured to store information least one processing core configured to cause the information to be transmitted toward a user equipment or base station partly via a cellular carrier and partly via a non-cellular carrier, the cellular and non-cellular carriers being together in a carrier aggregation, and in dependence of a random process, disable a ciphering of the part of the information conveyed toward the user equipment via the non-cellular carrier.

According to a tenth aspect of the present invention, there is provided a computer program configured to cause a method in accordance with at least one of claims the second and third aspects to be performed.

EMBODIMENTS

In connection with a handover of a cellular part of a cellular-non-cellular carrier aggregation, ciphering of information communicated over the non-cellular carrier may be disabled for the duration of the handover. A benefit of this is obtained in that information buffered in a non-cellular node, for example an access point, ciphered with a key associated with a source base station, is recoverable by a user equipment. Unless ciphering was disabled, the user equipment might receive some of this information but be unable to decipher it after the handover, as the user equipment might already be using a key associated with a target base station. Similar considerations apply in the uplink direction. Furthermore, handover smoothness may overall be enhanced as traffic may continue without interruption throughout the handover.

Figure 1:
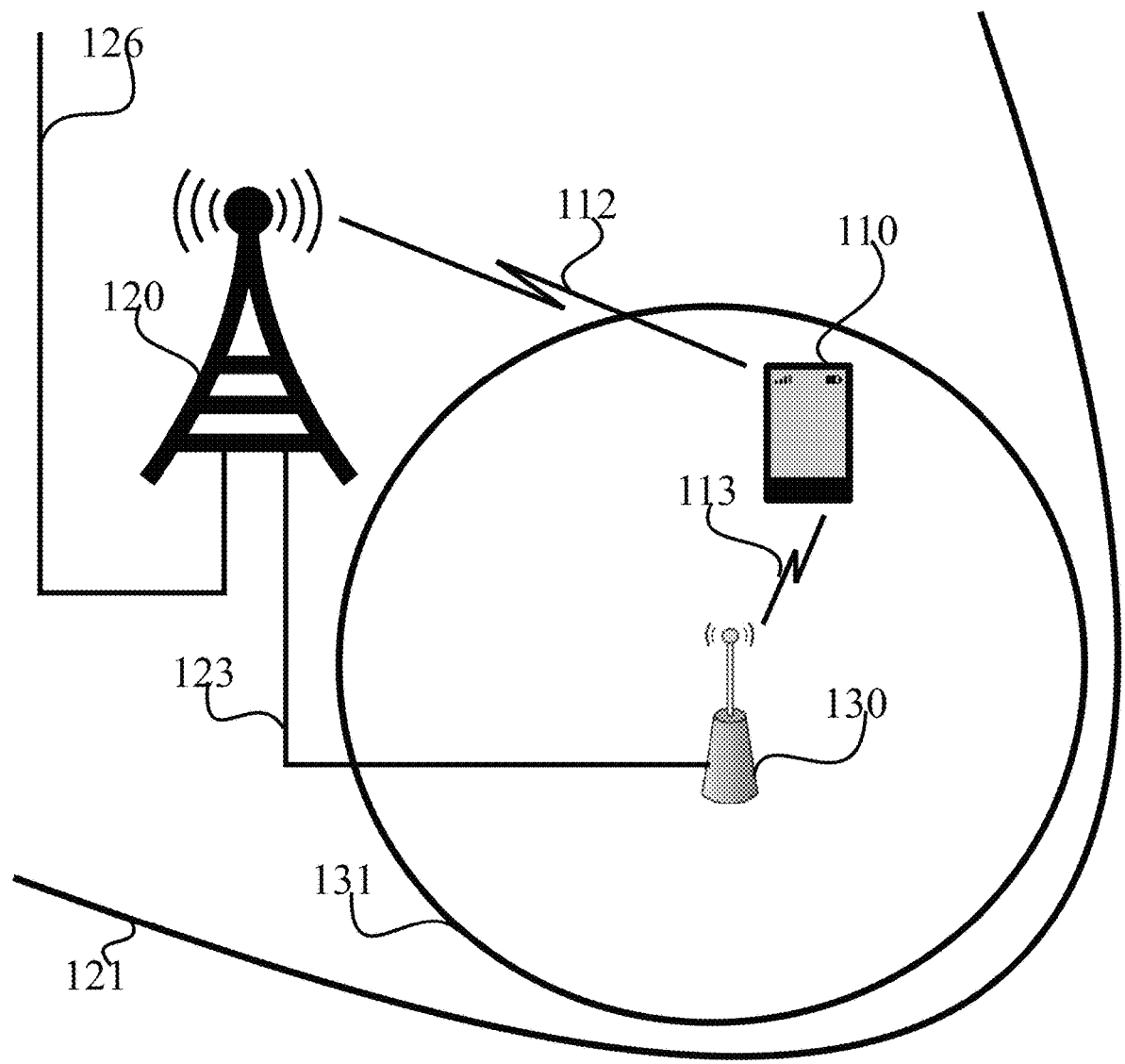
FIG. 1 illustrates an example system in accordance with at least some embodiments of the present invention.

FIG. 1 illustrates an example system in accordance with at least some embodiments of the present invention. The system of FIG. 1 comprises device 110, which may comprise a user equipment such as a smartphone, tablet device, smart watch or other suitable device. Device 110 is furnished with dual connectivity which comprises an ability to communicate via a cellular technology and a non-cellular technology. For example, this communication may take place simultaneously to both the cellular and non-cellular part for the same bearer, such as a radio bearer. Device 110 is configured to employ carrier aggregation wherein one carrier of the carrier aggregation is a cellular carrier and another carrier of the carrier aggregation is a non-cellular carrier.

In the system of FIG. 1, device 110 has a first carrier 112 with cellular base station 120, the first carrier being a cellular carrier. For example, first carrier 112 and base station 120 may be arranged to operate in accordance with LTE, 5G or WCDMA technology, for example. Device 110 has a second carrier 113 with access point 130. Access point 130 and second carrier 113 may be arranged to operate in accordance with a non-cellular technology such as WLAN or WiMAX, for example. First carrier 112 and second carrier 113 may be comprised in a same carrier aggregation.

Access point 130, while illustrated in FIG. 1 as cited away from base station 120, may alternatively be co-located with base station 120. A cell 121 controlled by base station 120 is schematically illustrated in FIG. 1. Likewise, a communication range 131 of access point 130 is schematically illustrated in FIG. 1. Device 110, being in cell 121 and communication range 131, is capable of communicating with both base station 120 and access point 130.

An interface 123 enables communication between base station 120 and access point 130. In some embodiments, a WLAN termination, WT, node is disposed between base station 120 and access point 130. Interface 123 may comprise an Xw interface, for example, where the carrier aggregation is LTE-WLAN, LWA, carrier aggregation. A Xw interface interconnects a base station and a WT node. A WT node may be co-located with an access point, and/or a WT functionality may be comprised in an access point. Interface 123 may carry both control and data plane traffic. Interface 123 may be arranged to convey traffic using GPRS tunnelling protocol for user plane, GTP-u, over UDP, for example. An IPsec tunnel may be established between base station 120 and device 110, via access point 130. IPsec keys, or other keys, may be derived by base station 120 and device 110, for example based on key $K_{eNB}$. Base station 120 is further connected to a cellular network via interface 126. For example, interface 126 may connect to a MME or S-GW in case the cellular technology is LTE. Base station 120 may thus provide information to device 110 over the carrier aggregation by transmitting a part of the information via first carrier 112, and by providing another part of the information, via interface 123, to access point 130 for transmission to device 110 via second carrier 113.

In the uplink direction, device 110 may provide information over the carrier aggregation by transmitting part of the information to base station 120 via first carrier 112, and another part to access point 130 via second carrier 113. Access point 130 will then forward, via interface 123, the another part of the information, received in access point 130 via second carrier 113, to base station 120. The information may comprise user-plane and control-plane data, for example.

First carrier 112 may employ an air interface ciphering in accordance with a cellular technology used in first carrier 112. Likewise, second carrier 113 may employ an air interface ciphering in accordance with a non-cellular technology used in second carrier 113. Further, base station 120 may perform ciphering of information before providing it to interface 123 and/or first carrier 112. Such ciphering, which may thus take place in addition to the air interface ciphering, may comprise intermediate-level ciphering, such as packet data convergence protocol, PDCP, and/or IPSec ciphering. Intermediate-level ciphering may thus comprise ciphering that is performed in a protocol stack between application level ciphering and air interface ciphering.

In general, LWA aggregating may be controlled by base station 120. Controlling may comprise activation and deactivation of the aggregating, for example. Base station 120 may configure a WLAN mobility set for device 110, for example based on WLAN measurements performed by device 110. A WLAN mobility set may comprise a set of access point identifiers, wherein mobility within the mobility set may be controlled by device 110. Access points comprised in a mobility set may have interfaces with each other, enabling mobility within the mobility set to be transparent to base station 120.

Device 110 may perform non-cellular measurements, such as for example WLAN measurements, to support carrier aggregation. For example, signal strengths from access points may be compared to thresholds to determine access points or access point sets that are usable. Device 110, being also a cellular device, may also perform cellular measurements, for example measurements usable in planning handovers between base stations.

Access point 130 may act under the direction of base station 120, without needing to communicate with a core network of the cellular network where base station 120 is comprised. The aggregation may be used in the downlink only direction, or both in downlink and uplink. Data transmitted via access point 130 may be encapsulated in LWA adaptation protocol, LWAAP, format, which may carry a bearer identity. LWIP encapsulation protocol, LWIPEP, may carry a bearer ID in case of LWIP. LWIP comprises LTE-WLAN radio level integration with IPsec tunnel.

Figure 2:
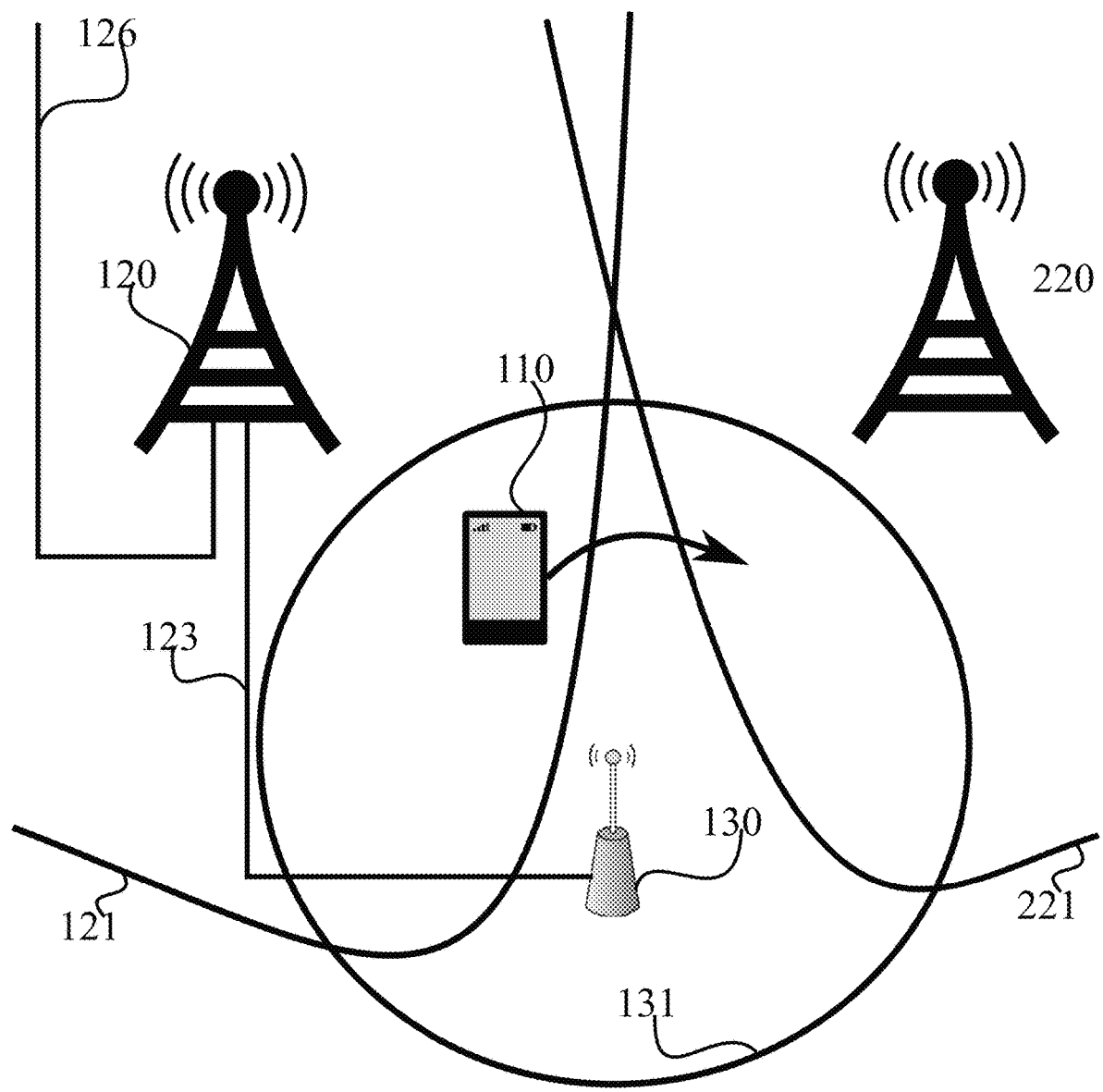
FIG. 2 illustrates an example system in accordance with at least some embodiments of the present invention.

FIG. 2 illustrates an example system in accordance with at least some embodiments of the present invention. The system of FIG. 2 resembles that of FIG. 1, and like numbering denotes like structure as in FIG. 1. For the sake of clarity, the carriers are not illustrated in FIG. 2. FIG. 2 illustrates a second base station 220, which controls a cell 221.

Device 110 is in the situation illustrated in FIG. 1 moving, as denoted by the black arrow, from cell 121 toward cell 221. A handover of the cellular carrier is therefore expected relatively soon, which base station 120 may determine from measurement reports it receives from device 110, for example. The handover, in the carrier aggregation scenario, in this case does not involve a change in the non-cellular carrier, since device 110 will remain within communication range 131 also after the handover. Therefore, while the cellular carrier will, after the handover, connect device 110 with base station 220, the non-cellular carrier will remain between device 110 and access point 130. In some cases, the non-cellular carrier may remain between device 110 and another access point in the same mobility set as the one where access point 130 is comprised. Such a handover changes the base station that provides the cellular carrier in the carrier aggregation, but does not change the access point, or at least part of the mobility set, that provides the non-cellular carrier in the carrier aggregation. An advantage of this type of handover is that data may continue to be provided to device 110 during the handover, via the non-cellular carrier. The cellular carrier may experience a discontinuity in case its handover is of the break-before-make type.

Where intermediate-level ciphering, such as PDCP ciphering and/or IPsec ciphering, is used, base station 120 may provide such ciphered packets to access point 130, for transmission to device 110. Access point 130 may buffer these packets, and in case the handover of the cellular carrier takes place before these packets are delivered to device 110, the packets may be delivered, via the non-cellular carrier, to device 110 after the handover has taken place. If device 110, in connection with the handover, begins using intermediate-level ciphering keys associated with base station 220, the buffered packets, delivered to device 110 after the handover, can no longer be deciphered in device 110 since the old key will no longer be available. An error situation may then ensue, possibly requiring re-transmissions if no data errors and/or packet losses are acceptable according to a quality of service in use.

To prevent the error situation, access point 130 or a WT node might be configured to transmit the packets concerned back to base station 120, base station 120 may decipher them and provide them to base station 220 for re-ciphering using the new intermediate-level ciphering keys, after which base station 220 could provide the re-ciphered packets to access point 130 for forwarding, via the non-cellular carrier, to device 110. Furthermore, where base station 120 is in communication with access points via a separate WT node, the WT node may have distributed the packets to access points for delivery to device 110. Recovering the packets from the access points may not even be possible.

To avoid such a complex procedure, base station 120 may be configured to determine a handover of the cellular carrier is likely, wherein the handover does not change an access point providing the non-cellular carrier, and to disable the intermediate-level ciphering before the handover takes place. Thus, packets that may be buffered in access point 130 when device 110 switches over to a new intermediate-level ciphering key are not ciphered, and their delivery to device 110 over the non-cellular carrier may proceed uninterrupted. Since the presence of the non-cellular carrier in this type of handover is beneficial overall, disabling the ciphering enhances not only application level processing but the smoothness of the handover itself. Base station 120 may determine the handover is likely based on measurement reports it receives from device 110. For example, base station 120 may determine, from the measurement reports, that a signal strength associated with the cellular carrier is declining while a signal strength associated with the non-cellular carrier is stable, or increasing.

Base station 120 may be configured to continue ciphering information transmitted over the cellular carrier, also when ciphering of information to be provided to access point 130 for transmission over the non-cellular carrier is disabled. A benefit of this is that security of these packets is maintained at a higher level.

In some embodiments, in case of LWIP, IPsec tunnelling may be avoided responsive to a determination the non-cellular access point is comprised in or as a trusted WLAN, In such a case, simple IP tunnelling may be used. In other words, IPsec ciphering may be disabled in these embodiments responsive to a determination the non-cellular carrier proceeds via a trusted WLAN.

Base station 120 may provide in packets left unciphered an indication that ciphering has not been used in the packets. The indication may take the form of an indicator bit in a LWAAP or LWIPEP header, for example. Base station 120 may provide an indication of the disabling of the ciphering to a WT node, such that the WT node need not inspect the packets to determine, whether they are ciphered. The disabling of the ciphering may be performed on a packet by packet basis, for example. The disabling may be associated with a limit, expressed, for example, as a number of packets or as a length of time. Once the limit is achieved, the disabling may responsively be ended. Once the handover is complete, base station 220, that is, the target base station, may re-enable the ciphering. Before re-enabling the ciphering, base station 220 may be in a ciphering-disabled mode for a short time. Since the non-cellular carrier benefits from air interface ciphering between access point 130 and device 110, security degradation from temporary disabling of intermediate-level ciphering is not excessive. Furthermore, the disabling of intermediate-level ciphering may be of short duration, further reducing any security degradation caused thereby. For example, the disabling may last, overall, tens or a few hundred milliseconds.

Base station 120, base station 220 and/or device 110 may further be configured to disable and enable the intermediate-level ciphering in dependence of a random process when no handover is determined to be likely. Examples of random processes include random or pseudorandom number generation and features of radio path fading. This may provide the benefit that when the ciphering is disabled, the packets concerned need not be deciphered with respect to the intermediate-level ciphering.

In the uplink direction, device 110 may be configured to determine a handover affecting the cellular but not the non-cellular carrier of the carrier aggregation. Device 110 may be arranged to determine this from measurement reports or from measurement data available to device 110, but not transmitted to the network. In case device 110 determined such a handover is likely, it may disable intermediate-level ciphering of packets it provides to the network via the non-cellular carrier. Such packets may be furnished with an indication ciphering has been disabled, for example in a LWAAP header. Alternatively to device 110 deciding on disabling the ciphering, base station 120 may inform device 110 that a handover of the described type is likely, responsive to which device 110 may disable the ciphering. Such informing may take the form of RRC signalling, for example. As a yet further alternative, the network may simply instruct device 110 to disable the ciphering.

Packets with an indication ciphering has been disabled may be routed around a deciphering stage in the receiving end, saving processing resources. In case of handover failure, the disabled ciphering may be re-enabled without delays, in the device 110 and/or base station end.

Figure 3:
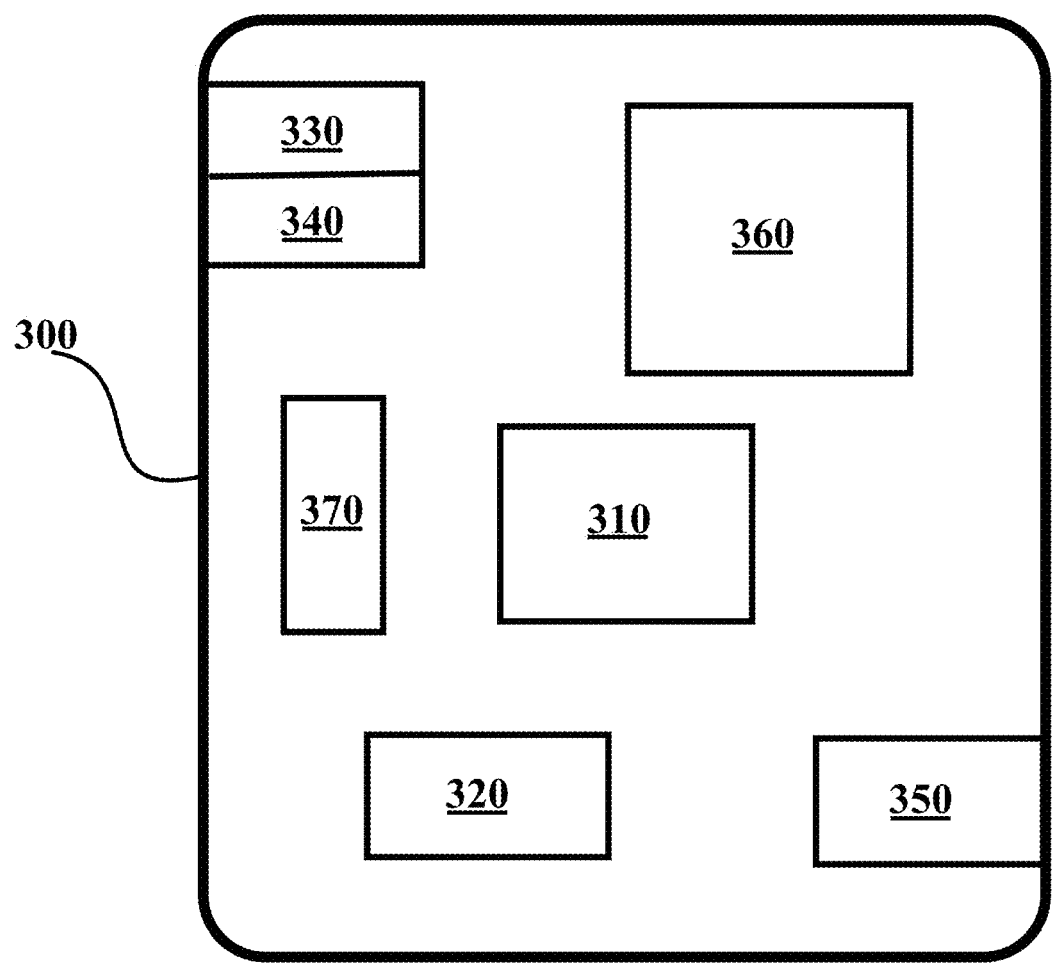
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, device 110 of FIG. 1 or FIG. 2, or, in applicable parts, base station 120. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
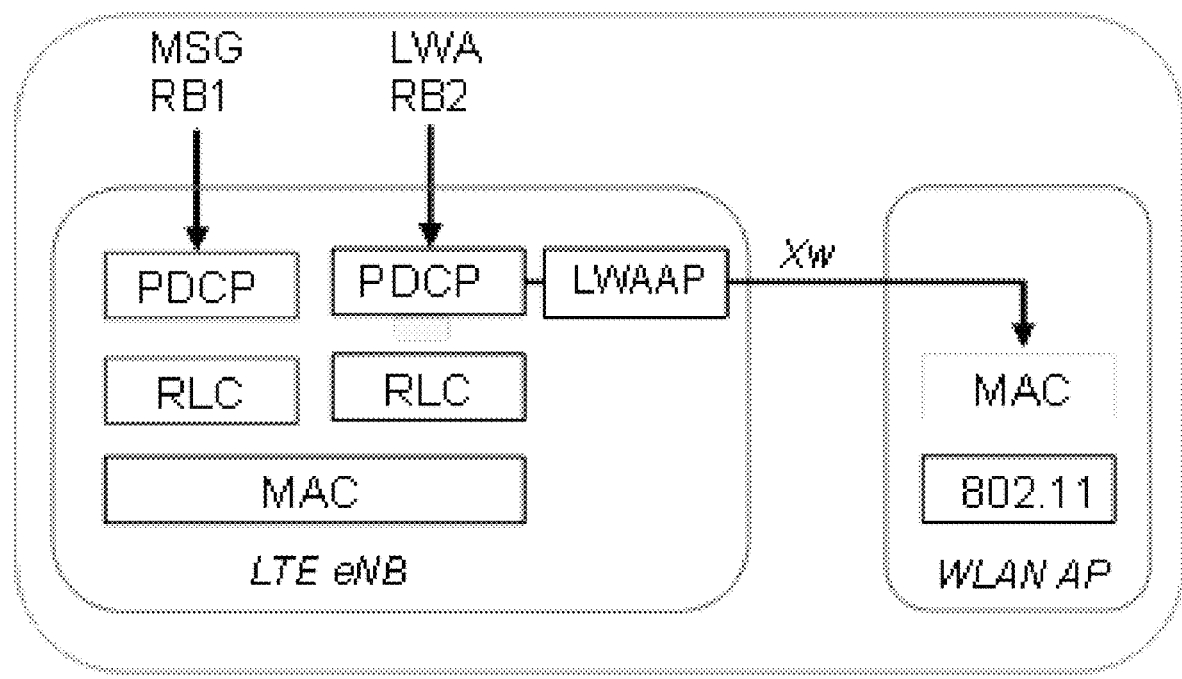
FIG. 4 illustrates a protocol structure in accordance with at least some embodiments of the present invention.

FIG. 4 illustrates a protocol structure in accordance with at least some embodiments of the present invention. Illustrated is an LWA Architecture for the non-co-located case where an Xw interface is introduced between the LTE base station, eNb, and a WT node. In the figure, the WT node is collocated with a WLAN access point. Radio link control, RLC, and medium access control, MAC, are present in the base station.

Figure 5:
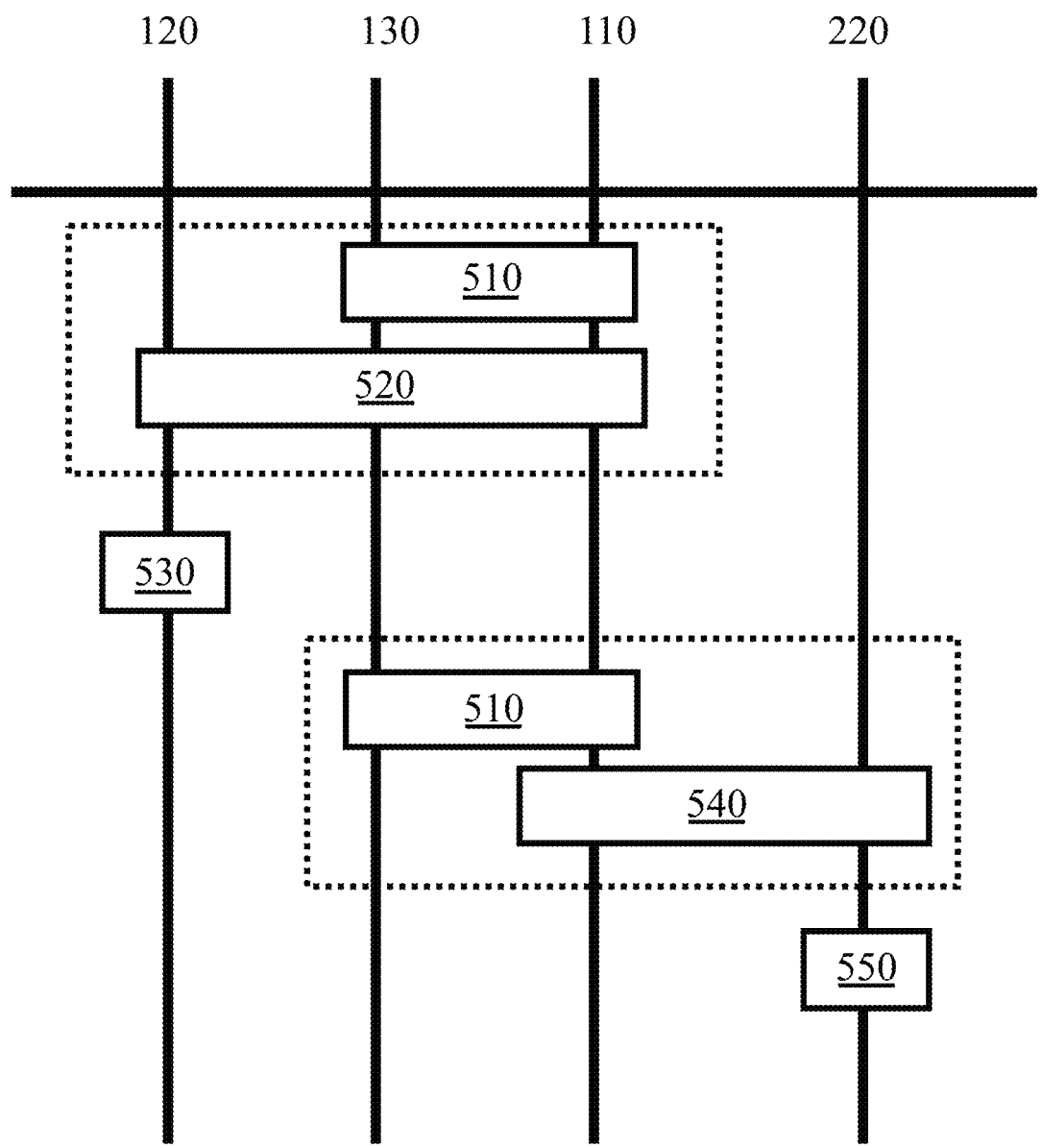
FIG. 5 illustrates a sequence in accordance with at least some embodiments of the present invention.

FIG. 5 illustrates a sequence in accordance with at least some embodiments of the present invention. On the vertical axes are disposed, from the left, base station 120, access point 130, device 110 and, on the right, base station 220. Time advances from the top toward the bottom.

Initially, a carrier aggregation comprising non-cellular carrier 510 and cellular carrier 520 connects device 110 to the network. The carrier aggregation is schematically illustrated in FIG. 5 with a dotted line. In phase 530, base station 120 determines that a handover of the cellular carrier, but not the non-cellular carrier, of this carrier aggregation is likely, for example based on measurement reports. Responsively, base station 120 disables ciphering, such as, for example, intermediate-level ciphering, such as PDCP ciphering, for information transmitted toward device 110 via non-cellular carrier 510, as described above.

Subsequent to the handover, the carrier aggregation connecting device 110 to the network comprises the non-cellular carrier 510, and a new cellular carrier 540 with base station 220. Subsequent to the handover, base station 220 may, at phase 550, re-enable the ciphering that was disabled in phase 530 by base station 120.

Note, that for the sake of simplicity non-cellular carrier 510 is drawn in FIG. 5 twice, while in the actual sequence of FIG. 5, the same non-cellular carrier is present throughout the sequence of phases.

Figure 6:
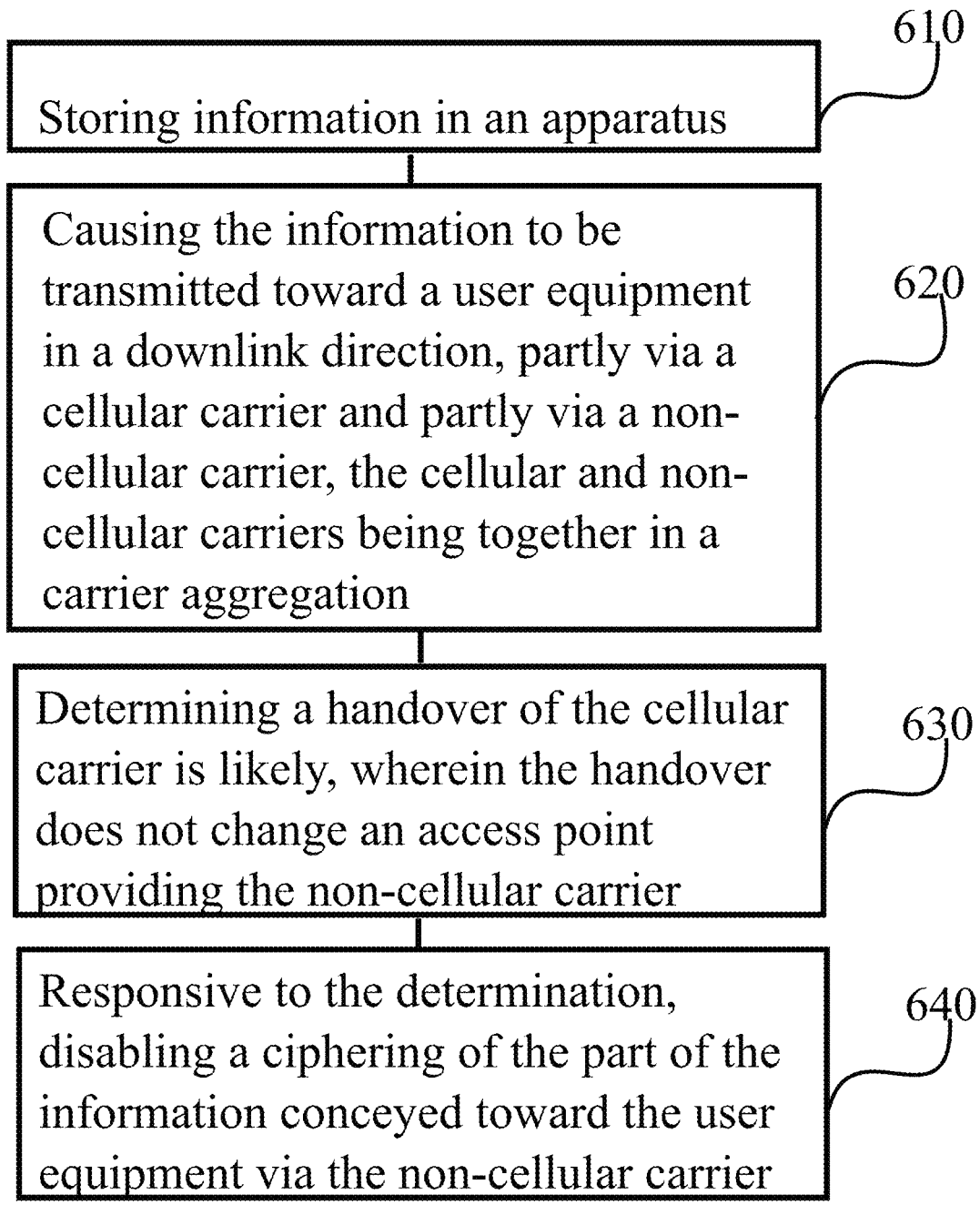
FIG. 6 is a flow graph of a method in accordance with at least some embodiments of the present invention.

FIG. 6 is a flow graph of a method in accordance with at least some embodiments of the present invention. The phases of the illustrated method may be performed in base station 120, or in a control device configured to control the functioning thereof, when implanted therein.

Phase 610 comprises storing information in an apparatus. Phase 620 comprises causing the information to be transmitted toward a user equipment in a downlink direction, partly via a cellular carrier and partly via a non-cellular carrier, the cellular and non-cellular carriers being together in a carrier aggregation. Phase 630 comprises determining a handover of the cellular carrier is likely, wherein the handover does not change an access point providing the non-cellular carrier. Finally, phase 640 comprises, responsive to the determination, disabling a ciphering of the part of the information conveyed toward the user equipment via the non-cellular carrier.

Figure 7:
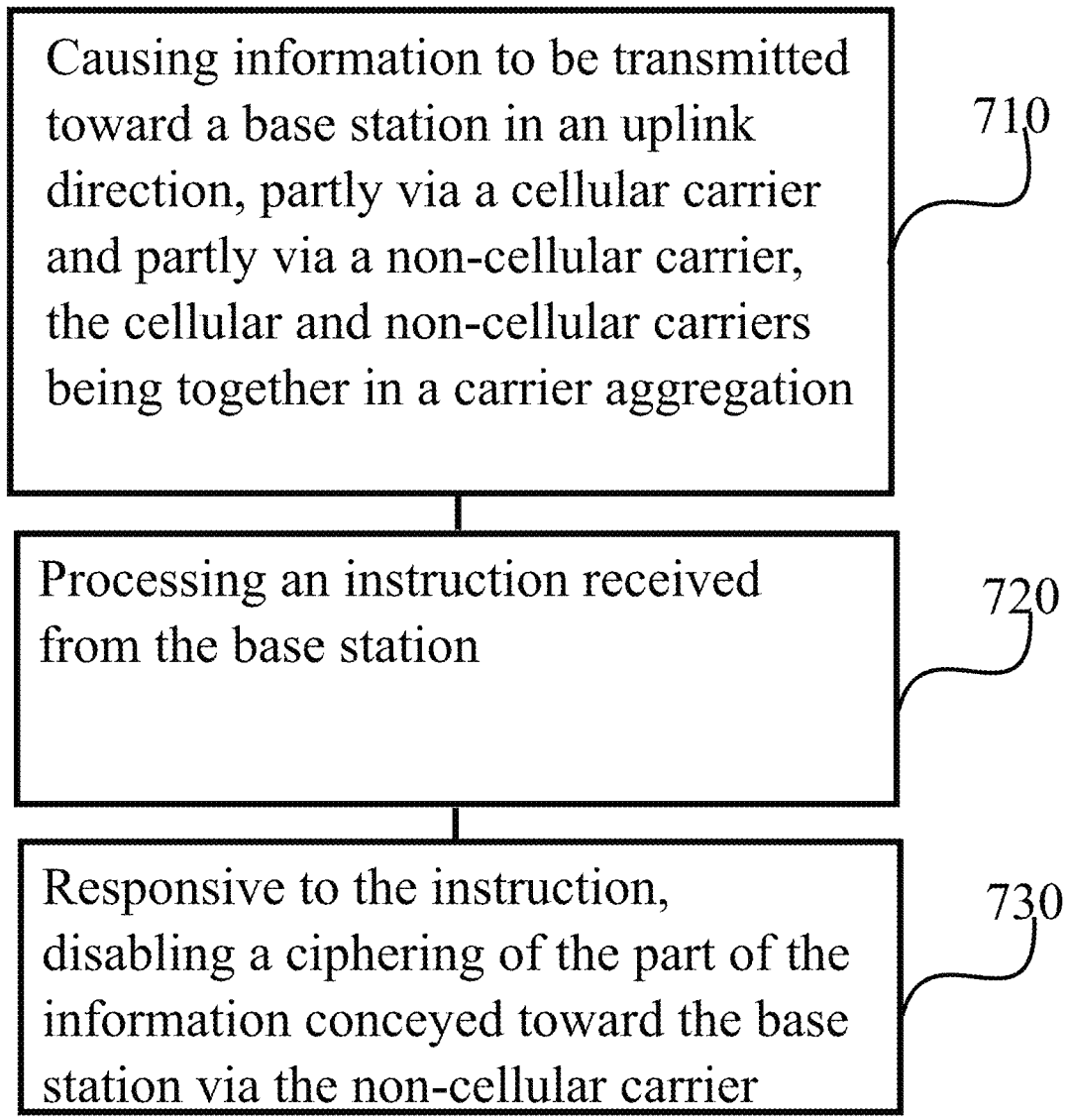
FIG. 7 is a flow graph of a method in accordance with at least some embodiments of the present invention.

FIG. 7 is a flow graph of a method in accordance with at least some embodiments of the present invention. The phases of the illustrated method may be performed in device 110, or in a control device configured to control the functioning thereof, when implanted therein.

Phase 710 comprises causing information to be transmitted from an apparatus toward a base station in an uplink direction, partly via a cellular carrier and partly via a non-cellular carrier, the cellular and non-cellular carriers being together in a carrier aggregation. Phase 720 comprises processing an instruction received from the base station. Finally, phase 730 comprises, responsive to the instruction, disabling a ciphering of the part of the information conveyed toward the base station via the non-cellular carrier. The determination may be based, for example, on measurements conducted by the apparatus or on a control signal received from the network.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in managing handovers in communication networks, for example heterogeneous networks.

| ACRONYMS LIST | |
|---|---|
| 5G | 5th generation, a cellular technology |
| GPRS | general packet radio service |
| GTP-u | GPRS tunnelling protocol for user plane |
| IPsec | internet protocol security |
| LTE | long term evolution |
| LWAAP | LWA adaptation protocol |
| LWA | LTE-WLAN aggregation |
| LWIP | LTE-WLAN radio level integration with IPsec tunnel |
| LWIPEP | LWIP encapsulation protocol |
| MME | mobility management entity |
| PDCP | packet data convergence protocol |
| RRC | radio resource control |
| S-GW | serving gateway (also "SGW") |
| UDP | user datagram protocol |
| WCDMA | wideband code division multiple access |

ACRONYMS LIST

| | |
|---|---|
| WiMAX | worldwide interoperability for microwave access |
| WLAN | wireless local area network |
| WT | WLAN termination |

REFERENCE SIGNS LIST

| | |
|---|---|
| 110 | Device (e.g. a smartphone) |
| 120, 220 | Base station |
| 130 | Access point |
| 112 | first carrier (cellular) |
| 113 | second carrier (non-cellular) |
| 121, 221 | cell boundary |
| 131 | communication range of access point 130 |
| 123 | Interface |
| 300-370 | Structure of the apparatus of FIG. 3 |
| 510-550 | Phases of the sequence of FIG. 4 |
| 610-640 | Phases of the method of FIG. 6 |
| 710-730 | Phases of the method of FIG. 7 |

The invention claimed is:

1. An apparatus comprising:
a memory configured to store information, and
at least one processing core configured to:
cause the information to be transmitted toward a user equipment in a downlink direction, partly via a cellular carrier and partly via a non-cellular carrier, the cellular and non-cellular carriers being together in a carrier aggregation;
determine a handover of the cellular carrier is likely, wherein the handover does not change an access point providing the non-cellular carrier, and
responsive to the determination, disable a ciphering of the part of the information conveyed toward the user equipment via the non-cellular carrier while continuing ciphering of the part of the information transmitted via the cellular carrier.

2. The apparatus according to claim 1, wherein the at least one processing core is configured to determine the handover is likely based at least partly on measurement reports received from the user equipment.

3. The apparatus according to claim 1, wherein the at least one processing core is configured to disable the ciphering on a packet by packet basis.

4. The apparatus according to claim 1, wherein the one processing core is configured to include in the part of the information conveyed via the non-cellular carrier an indication the ciphering has been disabled.

5. The apparatus according to claim 1, wherein the ciphering comprises ciphering applied to the part of the information conveyed via the non-cellular carrier before it is provided from the apparatus to the access point.

6. The apparatus according to claim 1, wherein the ciphering comprises at least one of: packet data convergence protocol ciphering and IPsec ciphering.

7. The apparatus according to claim 1, wherein the at least one processing core is configured to disable and enable the ciphering in dependence of a random process when no handover is determined to be likely.

8. The apparatus according to claim 1, wherein the apparatus comprises a long term evolution base station, or a long term evolution base station control device.

9. The apparatus according to claim 1, wherein the handover comprises handover of the cellular carrier to a cell of a cellular base station.

10. The apparatus according to claim 1, wherein the apparatus is configured to determine, whether a packet received in the apparatus comprises an indication the packet is not ciphered, and responsive to the packet comprising the indication the apparatus is configured to refrain from deciphering the packet, and responsive to the packet not comprising the indication the apparatus is configured to provide contents of the packet to a deciphering function.

11. An apparatus comprising at least one processing core, at least one memory including computer program code, the at least one memory and the computer program code being configured to, with the at least one processing core, cause the apparatus at least to:
cause information to be transmitted toward a base station in an uplink direction, partly via a cellular carrier and partly via a non-cellular carrier, the cellular and non-cellular carriers being together in a carrier aggregation;
process an instruction received from the base station, and responsive to the instruction, disable a ciphering of the part of the information conveyed toward the base station via the non-cellular carrier while continuing ciphering of the part of the information transmitted via the cellular carrier.

12. The apparatus according to claim 11, wherein the at least one memory and the computer program code are configured to, with the at least one processing core, cause the apparatus to request from the base station that ciphering should be disabled.

13. The apparatus according to claim 11, wherein the at least one memory and the computer program code are configured to, with the at least one processing core, cause the apparatus to disable the ciphering on a packet by packet basis.

14. The apparatus according to claim 11, wherein the at least one memory and the computer program code are configured to, with the at least one processing core, cause the apparatus to include in the part of the information conveyed via the non-cellular carrier an indication the ciphering has been disabled.

15. The apparatus according to claim 11, wherein the ciphering comprises packet data convergence protocol ciphering.

16. The apparatus according to claim 11, wherein the at least one memory and the computer program code are configured to, with the at least one processing core, cause the apparatus to disable and enable the ciphering in dependence of a random process when no handover is determined to be likely.

17. The apparatus according to claim 11, wherein the apparatus comprises a user equipment, or a user equipment control device, configured to operate in accordance with the long term evolution communication standard.

18. The apparatus according to claim 11, wherein the handover comprises handover of the cellular carrier to a cell of a cellular base station.

19. A method comprising:
storing information in an apparatus;
causing the information to be transmitted toward a user equipment in a downlink direction, partly via a cellular carrier and partly via a non-cellular carrier, the cellular and non-cellular carriers being together in a carrier aggregation;

determining a handover of the cellular carrier is likely, wherein the handover does not change an access point providing the non-cellular carrier, and responsive to the determination, disabling a ciphering of the part of the information conveyed toward the user equipment via the non-cellular carrier while continuing ciphering of the part of the information transmitted via the cellular carrier.

20. The method according to claim 19, wherein the determination the handover is likely is based at least partly on measurement reports received from the user equipment.

21. The method according to claim 19, wherein the ciphering is disabled on a packet by packet basis.

22. The method according to claim 19, further comprising including in the part of the information conveyed via the non-cellular carrier an indication the ciphering has been disabled.

23. The method according to claim 19, wherein the ciphering comprises ciphering applied to the part of the information conveyed via the non-cellular carrier before it is provided from the apparatus to the access point.

24. The method according to claim 19, wherein the ciphering comprises at least one of: packet data convergence protocol ciphering and IPsec ciphering.

25. The method according to claim 19, further comprising disabling and enabling the ciphering in dependence of a random process when no handover is determined to be likely.

26. The method according to claim 19, wherein the apparatus comprises a long term evolution base station, or a long term evolution base station control device.

27. The method according to claim 19, wherein the handover comprises handover of the cellular carrier to a cell of a cellular base station.

28. A method comprising:
    causing information to be transmitted from an apparatus toward a base station in an uplink direction, partly via a cellular carrier and partly via a non-cellular carrier, the cellular and non-cellular carriers being together in a carrier aggregation;
    processing an instruction received from the base station, and
    responsive to the determination, disabling a ciphering of the part of the information conveyed toward the base station via the non-cellular carrier while continuing ciphering of the part of the information transmitted via the cellular carrier.

29. The method according to claim 28, further comprising requesting from the base station that ciphering should be disabled.

30. The method according to claim 28, wherein the ciphering is disabled on a packet by packet basis.

31. The method according to claim 28, further comprising including in the part of the information conveyed via the non-cellular carrier an indication the ciphering has been disabled.

32. The method according to claim 28, wherein the ciphering comprises packet data convergence protocol ciphering.

33. The method according to claim 28, further comprising causing the apparatus to disable and enable the ciphering in dependence of a random process when no handover is determined to be likely.

34. The method according to claim 28, wherein the apparatus comprises a user equipment, or a user equipment control device, configured to operate in accordance with the long term evolution communication standard.

35. The method according to claim 28, wherein the handover comprises handover of the cellular carrier to a cell of a cellular base station.

36. A non-transitory computer readable medium having stored thereon a set of computer readable instructions that, when executed by at least one processor, cause an apparatus to at least:
    cause information to be transmitted toward a base station in an uplink direction, partly via a cellular carrier and partly via a non-cellular carrier, the cellular and non-cellular carriers being together in a carrier aggregation;
    process an instruction received from the base station, and
    disable, responsive to the instruction, a ciphering of the part of the information conveyed toward the base station via the non-cellular carrier while continuing ciphering of the part of the information transmitted via the cellular carrier.

* * * * *